United States Patent [19]

Masak

[11] Patent Number: 4,495,502
[45] Date of Patent: Jan. 22, 1985

[54] MULTIPLE LOOP SIDELOBE CANCELLER
[75] Inventor: Raymond J. Masak, East Northport, N.Y.
[73] Assignee: The United States of America as represented by the Secretary of the Air Force, Washington, D.C.
[21] Appl. No.: 343,042
[22] Filed: Jan. 27, 1982
[51] Int. Cl.³ .......................... G01S 3/16; G01S 3/28
[52] U.S. Cl. .................................................. 343/380
[58] Field of Search ............... 343/380, 383, 378, 379, 343/381, 446

[56] References Cited

U.S. PATENT DOCUMENTS

| | | | |
|---|---|---|---|
| 3,435,453 | 3/1969 | Howard | 343/100 |
| 3,836,978 | 9/1974 | Overbury | 343/379 X |
| 3,938,154 | 2/1976 | Lewis | 343/381 |
| 4,070,675 | 1/1978 | Daniel et al. | 343/100 LE |
| 4,097,866 | 6/1978 | Frost et al. | 343/100 LE |
| 4,170,775 | 10/1979 | Masak et al. | 343/100 LE |
| 4,177,464 | 12/1979 | Masak | 343/100 LE |
| 4,246,585 | 1/1981 | Mailloux | 343/373 |
| 4,268,829 | 5/1981 | Baurle et al. | 343/381 X |

*Primary Examiner*—Theodore M. Blum
*Assistant Examiner*—John B. Sotomayor
*Attorney, Agent, or Firm*—Donald J. Singer; Bernard E. Franz

[57] ABSTRACT

A sidelobe canceller using only a widely spaced auxiliary array can lose performance for multiple jammers located at angles corresponding to the grating lobe structure. The degradation is independent of the number of control loops used. A closely spaced auxiliary array cannot resolve and process closely spaced jammers but is less susceptible to grating lobe occurrences. Its performance can degrade for closely spaced jammers while the widely spaced array has the resolution capability required. A dual array approach comprised of both widely and closely spaced subarrays was simulated and tested. Each subarray automatically compensated for the deficiencies of the other. The computer simulations predicted the precise nature and locations of these geometrical conditions when the system was tested. Auxiliary channel preprocessing can successfully be used with the dual array approach to simultaneously minimize the differential level problem for multiple jammers. Without preprocessing of the auxiliary array, little, if any cancellation may be achieved against weaker jammers.

10 Claims, 11 Drawing Figures

MULTIPLE LOOP SIDELOBE CANCELLER

RIGHTS OF THE GOVERNMENT

The invention described herein may be manufactured and used by or for the Government of the United States for all governmental purposes without the payment of any royalty.

BACKGROUND OF THE INVENTION

This invention relates to the field of signal processors for radar receiving systems and communication systems, and more particularly relates to a sidelobe cancellation circuit used to suppress the effects of multiple interference sources being received by the main channel antenna.

Commonly, adaptive control loops are used to generate cancellation signals in response to interference signals. Typical null steering apparatus is described in U.S. Pat. No. 3,209,990 by P. W. Howell for "Intermediate Frequency Sidelobe Canceller". Apparatus of this type is used both in radar systems and in communication systems. See "Adaptive Arrays—An Introduction", by W. F. Gabriel in Proceedings of the IEEE, Vol. 64, No. 2, February 1976, pp 239 et seq. for a good introductory description, including the LMS algorithm.

S. M. Daniel, U.S. Pat. No. 4,070,675, shows a narrow beam main antenna that uses a wide beam array to enhance the performance of the main antenna in a jamming environment. D. D. Howard, U.S. Pat. No. 3,435,453, discloses an electronically scanned array which achieves sidelobe cancelling by using a wide beam auxiliary pattern with a narrow main beam pattern.

Other U.S. Pat. Nos. relating to sidelobe cancellers with a main antenna and multiple auxiliary antennas include 4,097,866; 4,170,755 and 4,177,464 by myself and others. These patents are incorporated by reference.

A problem that can limit sidelobe cancellation performance in real environments is the geometrical location of interfering sources with respect to the auxiliary array. It can be shown that a wide spaced auxiliary array is effective in cancelling closely spaced jammers but results in a substantial loss in performance at jammer locations corresponding to the array grating lobes. A closely spaced array reduces the grating lobe problem but shows a loss in sensitivity in cancelling closely spaced jammers. These two dual problems have been called geometrical anomalies.

In a realistic multiple jammer environment, both widely and closely spaced jammers may exist with random relative power distributions in the vicinity of the auxiliary array.

SUMMARY OF THE INVENTION

An object of the invention is to provide an approach which can simultaneously handle the differential level problem and the potential loss in performance due to these geometrical anomalies.

The invention relates to a space tapered multiple jammer sidelobe canceller, which possesses both widely and closely spaced auxiliary arrays. Through the use of a common simultaneous feedback signal to the control loops of each subarray, the system can effectively operate to reduce the effects of both forms of geometrical anomalies. When widely spaced jammers are not cancelled because of the ambiguity problem, the system automatically adjusts the weights of the closely spaced array for jammer cancellation. When closely spaced jammers cannot be cancelled because of the resolution limitations of the closely spaced array, the system automatically adjusts the weights of the widely spaced array for jammer cancellation. In this manner, the deficiencies of one subarray are automatically compensated by the other.

Two forms of spatial preprocessing are available in the system. A Butler Matrix can be used with the closely spaced array to isolate individual jammers onto separate beamport outputs, at least on an average basis. When an LMS control loop sees one and only one jammer, a properly designed system can work well since the differential level problem has been eliminated for that control loop.

A second form of preprocessor is used for the widely spaced array. This multilevel (ML) configuration uses a set of three additional control loops between the array outputs and the conventional set of three lower loops. This form of preprocessor, in effect, operates on the omnidirectional array signals to generate a set of notched omni patterns at the inputs to the lower control loops. The notches are generated by internal feedback signals to isolate individual jamming signals at the inputs to the lower loops. When this isolation is established, the system becomes less sensitive to the differential level problem since one loop is again operating on one and only one jammer.

DETAILED DESCRIPTION

The invention is described in an unpublished report on a "Space Tapered Multiple Jammer Canceller", Report No. RADC-TR-78-149, Government Accession No. AD-CO14959, the first three sections of which are attached hereto as an appendix and hereby incorporated by reference.

Figure 1:
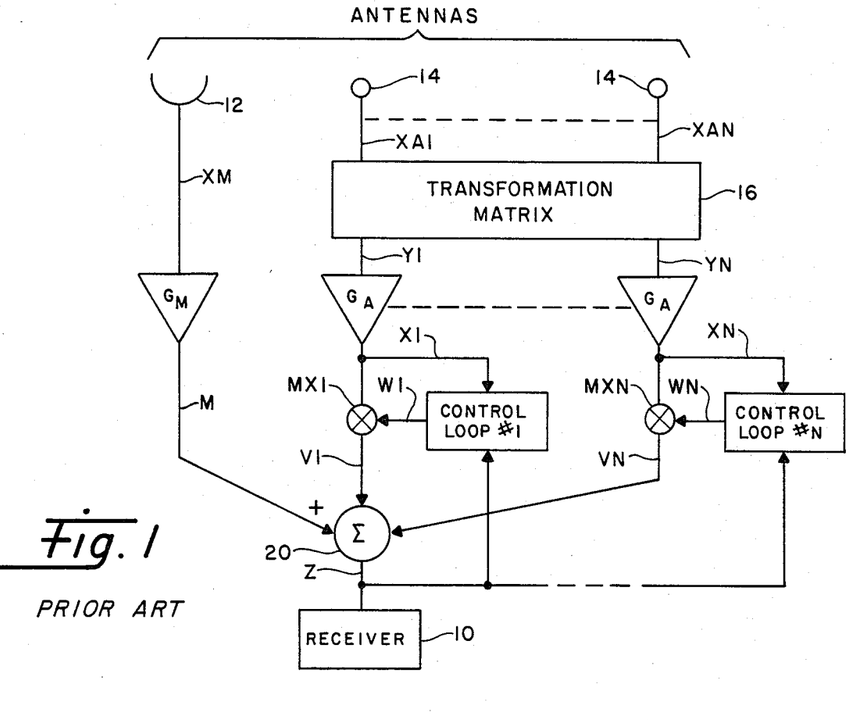
FIG. 1 is a block diagram of a typical prior art sidelobe canceller.

A conventional adaptive sidelobe canceller system as used with a radar receiver 10 is shown in FIG. 1. A main beam forming antenna 12 (usually a horn-fed parabolic reflector) is augmented by some geometrical arrangement of a number (N) of omni-antennas 14 to provide the means of performing sidelobe cancellation.

Finite aperture limitations preclude perfect spatial selectivity; therefore, one or more strong sources of interference outside the observed angular sector of the main antenna can deprive the radar system of its designed performance capability. The omni antennas provide a source of interfering signal replicas which can be adjusted in amplitude and phase to produce a null when subtracted from the signal received by the main antenna.

The signals received on the omni antennas 14 are shown as inputs to a transformation matrix. A conventional configuration is obtained when the transformation matrix is the identity matrix, or in other words, when the matrix does not alter the signals. The outputs Y1-YN from the transformation matrix are amplified, and the resulting signals on leads X1-XN are supplied as inputs to the control loops 1 to N, and also to multipliers MX1-MXN respectively. The control loops provide complex weights at leads W1-WN which are second inputs to the respective multipliers. Thus, each omniderived signal is multiplied by a complex weight. The multiplier output signals are supplied via leads V1-VN to a summing device 20 along with a main-antenna derived signal on lead M. The combination process is equivalent to summing the weighted omni signals followed by a subtraction from the main signal. The combined signal from the summing device on lead Z is used as the input to the receiver 10, and also as a feedback signal to all of the control loops 1-N. This combined feedback signal and the unweighted omni signals on leads X1-XN are correlated in the control loops to derive the respective weight multipliers.

Figure 2:
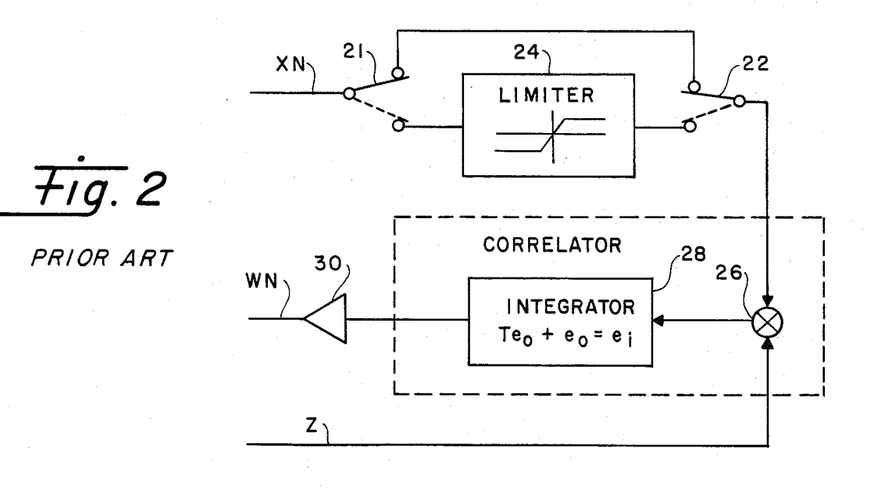
FIG. 2 is a block diagram of a typical control loop for FIG. 1.

A functional block diagram of a control loop is shown in FIG. 2. Two forms of control loop are shown in the figure. Strict adherence to the LMS (least mean squares) algorithm dictates that the system be implemented by the functional form attained when the switches 21, 22 are set to bypass the limiter 24. When the limiter is in the control loop, the single jammer performance is improved. The principal part of the control loop is a correlator which comprises a multiplier 26 for combining the two input signals, followed by an integrator 28. The output passes through an amplifier 30 to supply the complex weight function at lead WN.

A statement that is frequently heard on the subject of SLC's (sidelobe cancellers) without qualification is essentially contained in the following quote: "Signals from N independent sources of interference can be cancelled by a SLC using N auxiliary antennas". Careful examination of the SLC theory reveals that the statement is not without conditions. The statement is unconditionally applicable only when the array of N auxiliary elements is capable of forming an arbitrary pattern with the same (or better) resolution as the main antenna aperture.

Most sidelobe cancellers use some form of the least mean square (LMS) algorithm to control the weighting circuits of the auxiliary array. Theoretical analysis and experimental measurements indicate that the control loops operate primarily on the larger signal in a multiple jammer environment because of the power inversion principle. Although substantial cancellation against the largest jammer can be achieved, little or no performance may be obtained against the weaker components. Theoretical and experimental evidence exists concluding that the auxiliary array can be preprocessed by a transformation matrix to minimize this differential level problem.

The matrix transformation is not required for equal power jammers. Substantial cancellation can be achieved against all jammers in an equal power scenario, both with and without this preprocessor as long as the number of jammers does not exceed the degrees of freedom or, equivalently, the number of control loops available.

This restriction on the number of degrees of freedom is a necessary but insufficient condition for proper system operation. Relationships exist between the auxiliary array configuration and the geometrical angles of a multiple jammer scenario which may totally destroy system performance, regardless of the number of degrees of freedom available and whether or not an equal power condition exists.

When a widely spaced auxiliary array is used, a correlation can be established between the inherent grating lobe structure and widely separated multiple jammer angles at which performance collapses. A closely spaced array with fewer grating lobes can be used to process these widely spaced jammers. The closely spaced array, however, cannot process closely spaced jammers since it does not possess the resolution capability to separate and individually weight each jamming component. The widely spaced array does not suffer from a lack of resolution capability and, therefore, can cancel closely spaced jammers well. These two dual problems have been called geometrical anomalies.

In a realistic multiple jammer environment, both widely and closely spaced jammers may exist with random relative power distributions in the vicinity of the auxiliary array. A system design should be a configuration approach which can simultaneously handle the differential level problem and the potential loss in performance due to these geometrical anomalies.

This invention provides a solution in the form of a space tapered multiple jammer canceller which possesses both widely and closely spaced auxiliary arrays that provides a solution to these problems.

Figure 3:
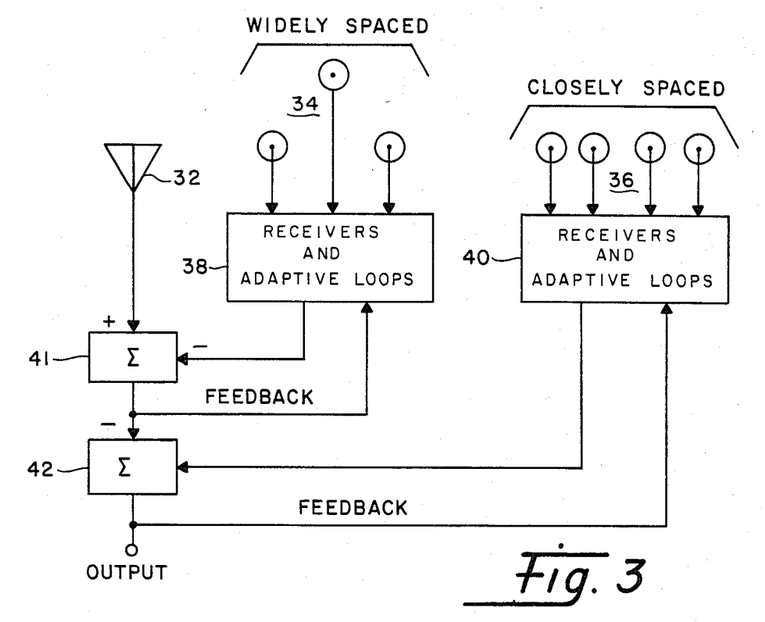
FIGS. 3 and 4 are block diagrams of space tapered sidelobe canceller with sequential and simultaneous feedback respectively.
Figure 4:
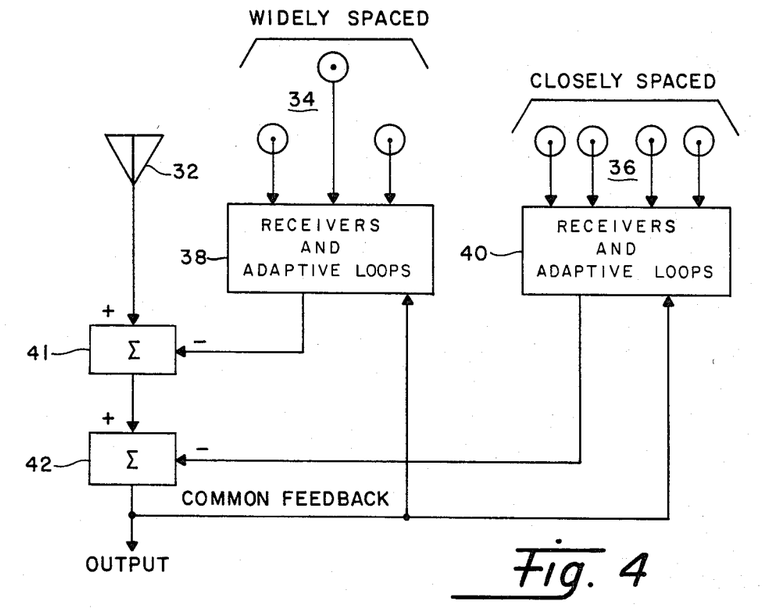

FIGS. 3 and 4 show alternate forms of space-tapered processing. The different approaches are characterized by the selection of feedback systems to the two subsystems. Both have a main antenna 32, a wide spaced triangular array 34, and a close or narrow spaced line array 36. The signals from the wide spaced array are processed by a set of receivers and adaptive loops 38, and the signals from the close spaced array are processed by a set of receivers and adaptive loops 40. Both are also shown with first and second summing circuits 41 and 42, with inputs to the first one from the main antenna and one of the subsystems while the other has inputs from the first summer 41 and from the other subsystem.

In the sequential scheme of FIG. 3 separate feedback signals for the wide spaced array and the close or narrow space array are generated after independent cancellation nodes. The order of feedback signal generation can be changed to either wide-narrow or narrow-wide depending on which subarray is processed at the first cancellation node 41. Some simulations were performed with sequential feedback. Performance was found to be strongly dependent on the ordering of the cancellation nodes 41 and 42. This phenomenon occurs principally because the feedback signals are, in a sense, decoupled from one another. The processed signal structure set up at the output of the first summer 41 becomes in essence a new main channel for use as an input to the second summer 42. The feedback signal from the output of summer 42 only controls, for the case shown in FIG. 3, the control loops of subsystem 40 associated with the closely spaced array 36.

The simultaneous configuration of FIG. 4 uses a common feedback signal for all control loops.

Figure 5:
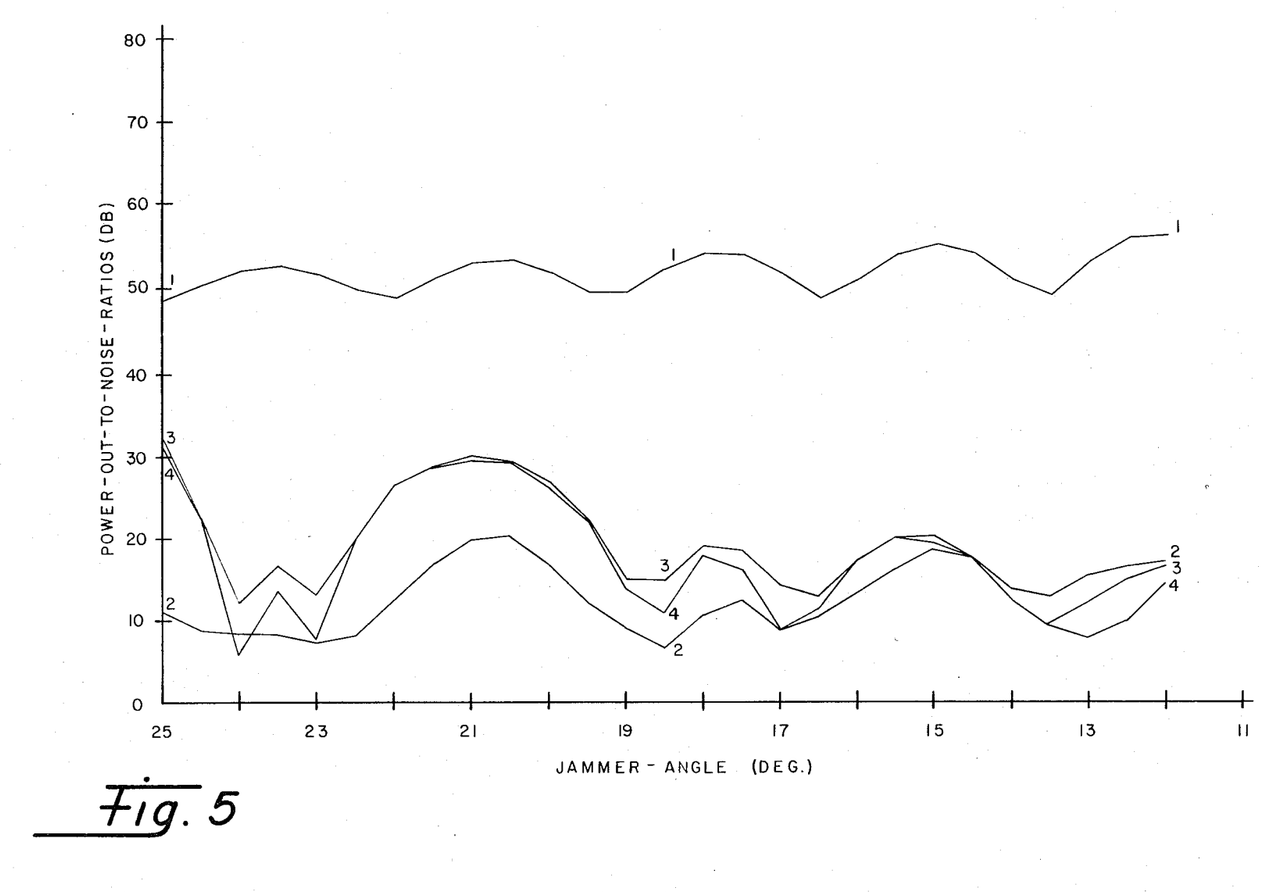
FIG. 5 comprises graphs showing comparative performance of different sidelobe canceller systems.

FIG. 5 is a graph showing computer simulations with a comparison of simultaneous and sequential feedback with no preprocessing for four jammers. Curve No. 1 shows the ratio of total interference power in the main channel (jammers+noise) to the main channel thermal noise power alone. This ratio is over 50 dB on the average. All other curves represent the total interference power at the output of a state of processing relative to the main channel noise power.

Curve No. 3 shows the power-out-to-noise ratio for a closely-spaced four element adaptive side-lobe canceller (ASLC). Degraded performance is noted just to the left of 25° (off scale) and at 21°. Regions of degraded performance have been noticed to occur more frequently with widely spaced elements. In fact, a direct correlation exists with the azimuthal regions of poor performance and the grating lobe pattern of the auxiliary array. A wide-spaced auxiliary array has, of course, many grating lobes. Simultaneous processing has been shown to be effective in this case also.

Curve No. 4 of FIG. 5 shows the power-out-to-noise ratio for sequential processing by a closely-spaced ASLC and widely-spaced (10.5λ) ASLC. Sequential processing narrow-wide is defined by the first processing configuration (closely spaced) arranged in a conventional manner (main channel signal minus weighted auxiliary channel signals) followed by the second processing configuration (widely spaced) arranged such that the output of the first processor acts as the main channel signal for the second processor. The difference in performance between curves No. 3 and No. 4 is very slight. The sequential processor shows the most improvement where it is needed the least.

Curve No. 2 shows the power-out-to-noise ratio for simultaneous processing of the two ASLC configurations. Simultaneous processing is defined by the main channel signal minus the weighted auxiliary signals from both configurations as shown in FIG. 4. Defined in this manner, it is identical to a single ASLC with a space-tapered (nonuniform) distribution of auxiliary antennas. The most significant performance improvement is noted at angles near 25° and 21° which represent the areas of poor performance for the closely-spaced ASLC alone. Other experiments with and without preprocessing in one or both subsystems further confirmed this improvement at different angles with different locations of two, three, and four jammers.

SYSTEM CONFIGURATION

Figure 6:
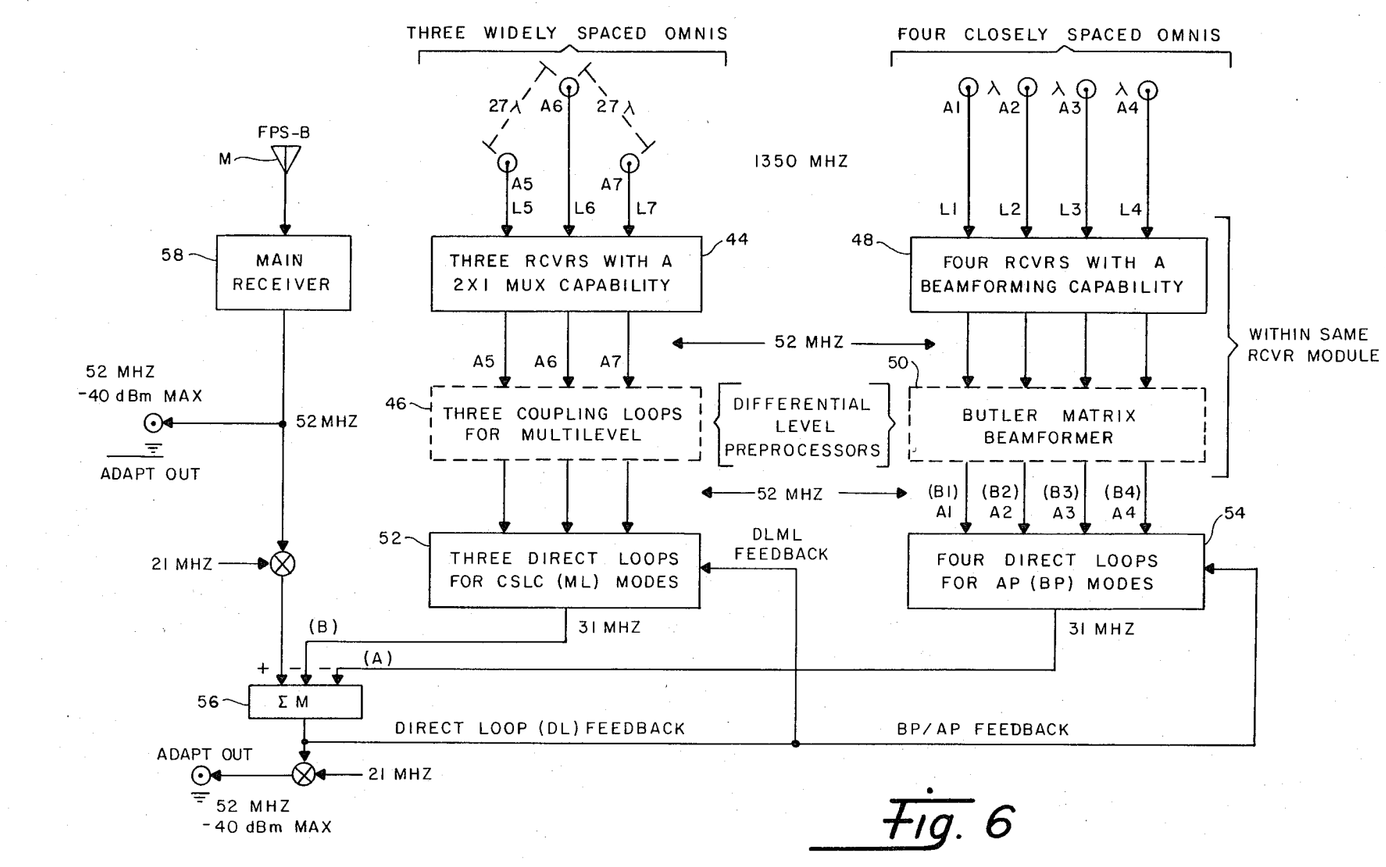
FIG. 6 is a block diagram of an experimental space tapered sidelobe canceller system.

FIG. 6 is a functional block diagram of a system installed and tested. The major processing functions include:

1. A widely spaced triangular array of L-band omnidirectional antennas A5, A6, A7 with about 27 wavelengths interelement spacing;
2. Four closely spaced omnis A1, A2, A3, A4 with one wavelength interelement spacing;
3. A module 44 containing three receivers associated with the widely spaced array. This module also contains some of the circuits required for a 2×1 multiplexing experiment;
4. Three coupling loops 46 for use as a differential level preprocessor for the widely spaced array.
5. Four receivers 48 for use with the closely spaced array.
6. A Butler Matrix preprocessor 50 for use with the closely spaced array (integrated within the four-receiver module), and
7. Three direct control loops 52 for the widely spaced array and four direct loops 54 for the closely spaced array.

The term "direct" implies a conventional sidelobe canceller configuration with no preprocessing. A sidelobe canceller operating with only direct loops is generally susceptible to the differential level problem in a multiple jammer environment. The 31 MHz weighted outputs of the two sets of direct loops (B and A) are subtracted from the main channel at summer 56 where jammer reduction occurs in the sidelobe structure of the FPS-8 antenna M. The system feedback signals are generated after this cancellation node. A common direct loop (DL) feedback branch to both sets of direct loops is used as well as individual branches to the set of three loops associated with the widely spaced array (DLML) and to the set of four loops associated with the closely spaced array (BP/AP).

The main channel receiver 58 supplies the signals against which cancellation is performed. All receivers have an IF output frequency of 52 MHz. The main channel signal is mixed with the system 21 MHz oscillator to generate a 31 MHz input to the + port of summer 56. A sample of the 52 MHz channel receiver, prior to mixing and cancellation, forms the unadapted system output ($\overline{\text{ADAPT}}$). The adapted system output (ADAPT) is formed by mixing the 31 MHz output of summer 56 with the system 21 MHz oscillator to generate a signal at an IF frequency of 52 MHz. The −40 dBm nominal output levels from both the ADAPT and $\overline{\text{ADAPT}}$ ports are chosen for compatibility with the log amplifier/detector circuits used to drive the laboratory chart recorder.

ANTENNA ELEMENTS

The main antenna M is a FPS-8 L-band radar antenna. A Hazeltine Model 2287 antenna is used as the basic omnidirectional element for the system. These antennas are horizontally polarized and contain built-in diode limiters. The limiters are used to protect the auxiliary channel receivers when the FPS-8 transmitter is turned on. These limiters can take a 1 kW peak pulse lasting for 1 μs at a duty factor of 1%. The output of the limiter for a 1 kW pulse input is a pulse with about 20 dBm peak power. The limiters operate linearly for input signals below about 0 dBm. All seven antenna-limiter pairs are electrically identical.

BEAMFORMING TECHNIQUE

Figure 7:
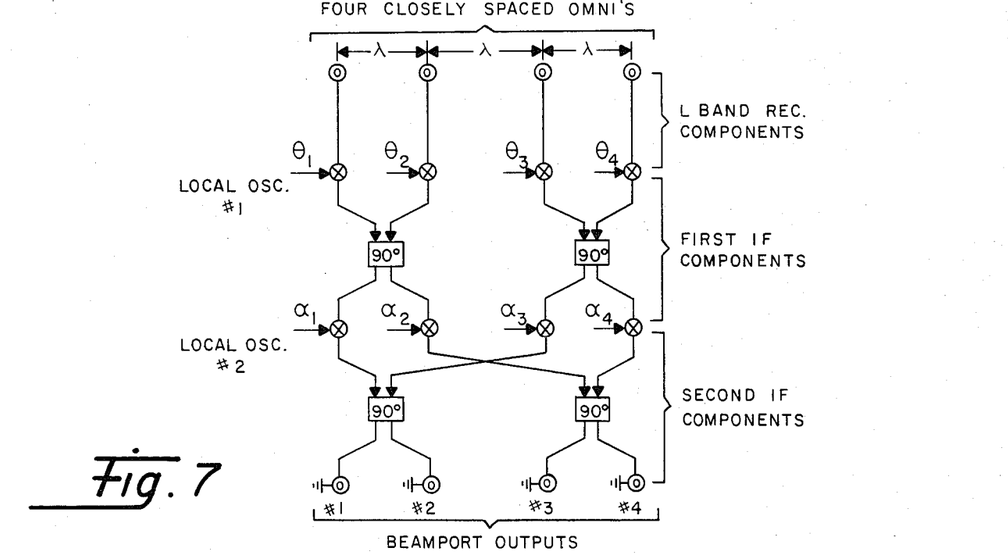
FIG. 7 is a functional block diagram of a beam forming technique for a preprocessor in FIG. 6.

A hybrid technique is used to implement the phasing required to generate the four beamport outputs, such as that covered by U.S. Pat. No. 4,170,775 by Masak et al for a Communication System Beamport Sidelobe Canceller. FIG. 7 is a block diagram of the hybrid approach in which the necessary phase shifting operations are implemented by adjustment of the phases of the two local oscillators used in each receiver chain.

CONTROL LOOP CONFIGURATIONS

The system contains ten analog IF adaptive control loops based on the LMS algorithm. The seven direct loops are all designed in the same manner; each uses a double balanced mixer as the weighting network with the difference frequency component selected for cancellation against the main channel signal. The three coupling loops used as a preprocessor for the direct loops associated with the widely spaced array are similar to the direct loops except that a vector modulator weighting device is used. This form of weight has an output carrier frequency identical to the input carrier frequency. Video I and Q signals are used as controls.

DIRECT LOOP CONFIGURATION

Figure 8:
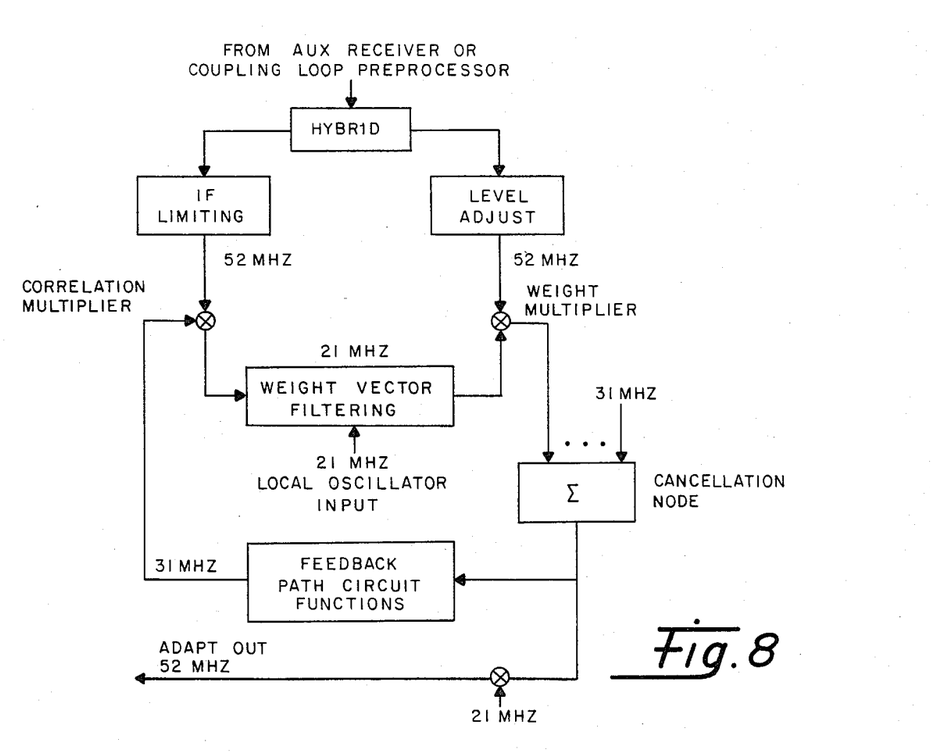
FIG. 8 is a simplified block diagram of a direct control loop configuration for FIG. 6.

FIG. 8 is a simplified block diagram of the circuit configuration used for each of the seven direct control loops. The required 52 MHz input to each control loop comes from the 52 MHz receiver outputs or the coupling loop preprocessor. One input is limited in IF circuitry which is designed to preserve the phase of the input signal during limiting. The limited output is the reference signal input to the loop correlation multiplier.

Limiting helps to minimize theoretical variations in control loop gain which strongly depends upon input signal power levels. As a practical matter, it also tends to preserve a constant conversion loss through the correlation mixer. Without limiting, the conversion loss through the correlation multiplier would increase dramatically as the reference input to the multiplier decreases from some nominal design level. An increase in conversion loss results in a net decrease in effective loop gain and resulting system performance.

The weight multiplier input to the control loop configuration of FIG. 8 is padded in the "Level Adjust" operation indicated in order to minimize two-tone intermodulation products which may be generated in the weight multiplier. The 52 MHz input to the weight multiplier is multiplied by a weight vector from the weight vector filtering module. The outputs of the weight multipliers are summed with the main channel in a cancellation node generating both the system output and a feedback signal at 31 MHz. The formation of the feedback signal closes the loop after multiplication at the correlation multiplier and subsequent processing in the weight vector filtering module.

In addition to other more conventional circuits, this module contains a narrowband IF filter centered at 21 MHz with a loaded Q of approximately 26,000. This narrowband filter integrates the output of the correlation multiplier generating an error signal which is used to form the weight vector. In all direct loops, the weight vector equals an amplified version of the narrowband filter output.

A limiter path is used in each of the ten control loops. The inputs to the limiting modules contained in each control loop come from the appropriate 52 MHz outputs of the associated auxiliary receiver or internally generated 52 MHz sample signals within the coupling loop preprocessor. The actual IF limiting is accomplished by cascading three separate limiter modules.

Figure 9:
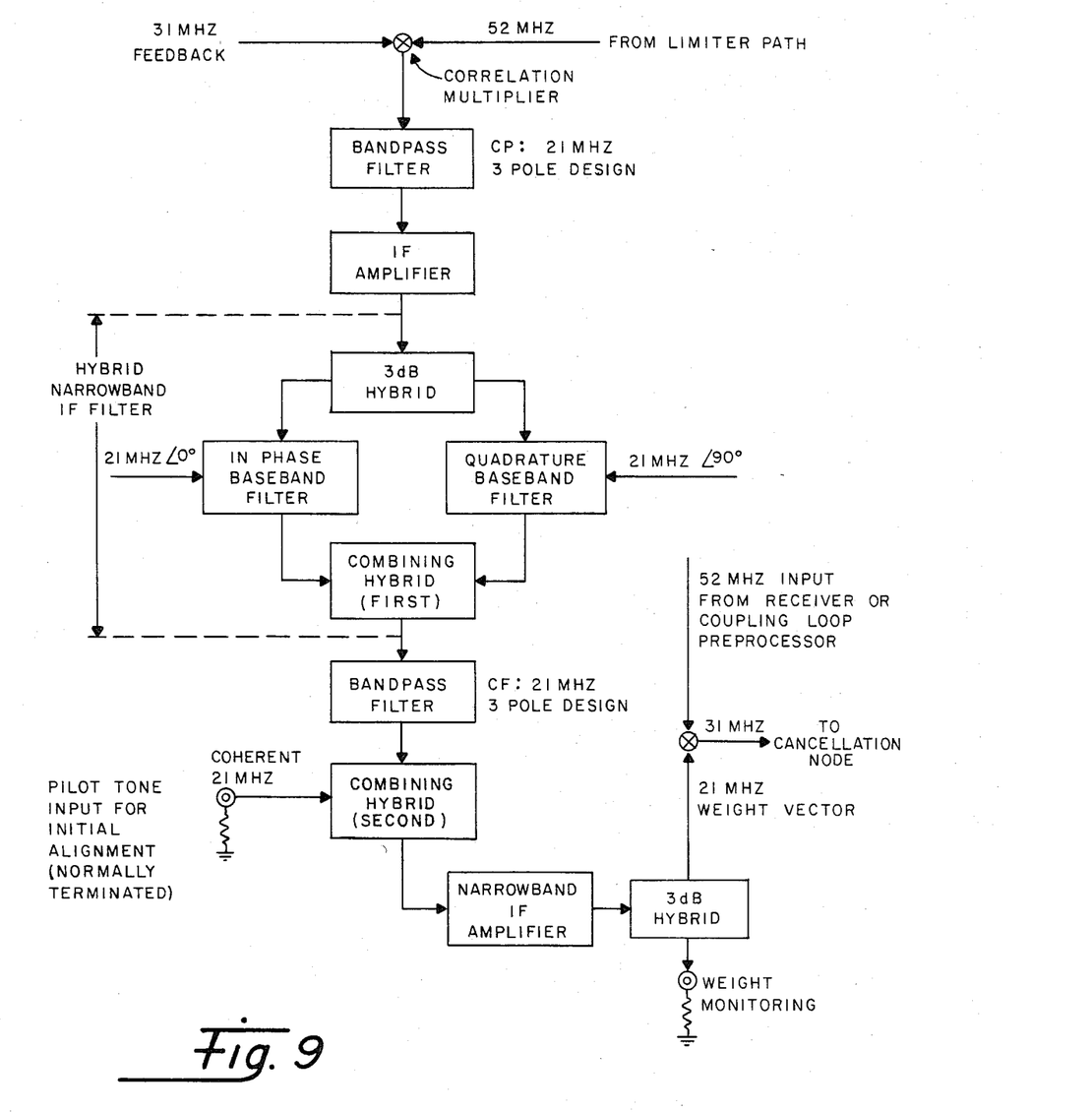
FIG. 9 is a block diagram for a weight vector filtering technique for FIG. 8.

FIG. 9 is a block diagram describing the basic operations performed in each weight vector filtering module used in the seven direct loops. The 21 MHz output of the correlation multiplier is selected by a three-pole bandpass filter. The output of the filter is amplified to levels chosen for optimum operation of the hybrid narrowband IF filter.

The output of the IF amplifier drives the hybrid baseband-IF narrowband filter. As an IF filter, this circuitry has approximately 1 kHz bandwidth centered at 21 MHz. The gain and phase functions across the frequency band are chosen in accordance with a stability analysis for the system. It is this filter which performs the control loop integration.

The output of the baseband filter at IF is generated by combining the in-phase and quadrature components of the remodulated and filtered baseband signals. The combination occurs in a summing IF hybrid. The output of the hybrid is passed through a bandpass filter in order to attenuate the second order harmonics of 21 MHz generated in the IF remodulation process. The bandpass filter is a three-pole design centered at 21 MHz. The output of this last bandpass filter generates the control loop error signal resulting from the correlation (multiplication and integration in a narrowband IF filter) of the input signal with the feedback signal. A narrowband IF amplifier generates the nominal level for the 21 MHz weight vector.

COUPLING LOOP PREPROCESSOR

Figure 10:
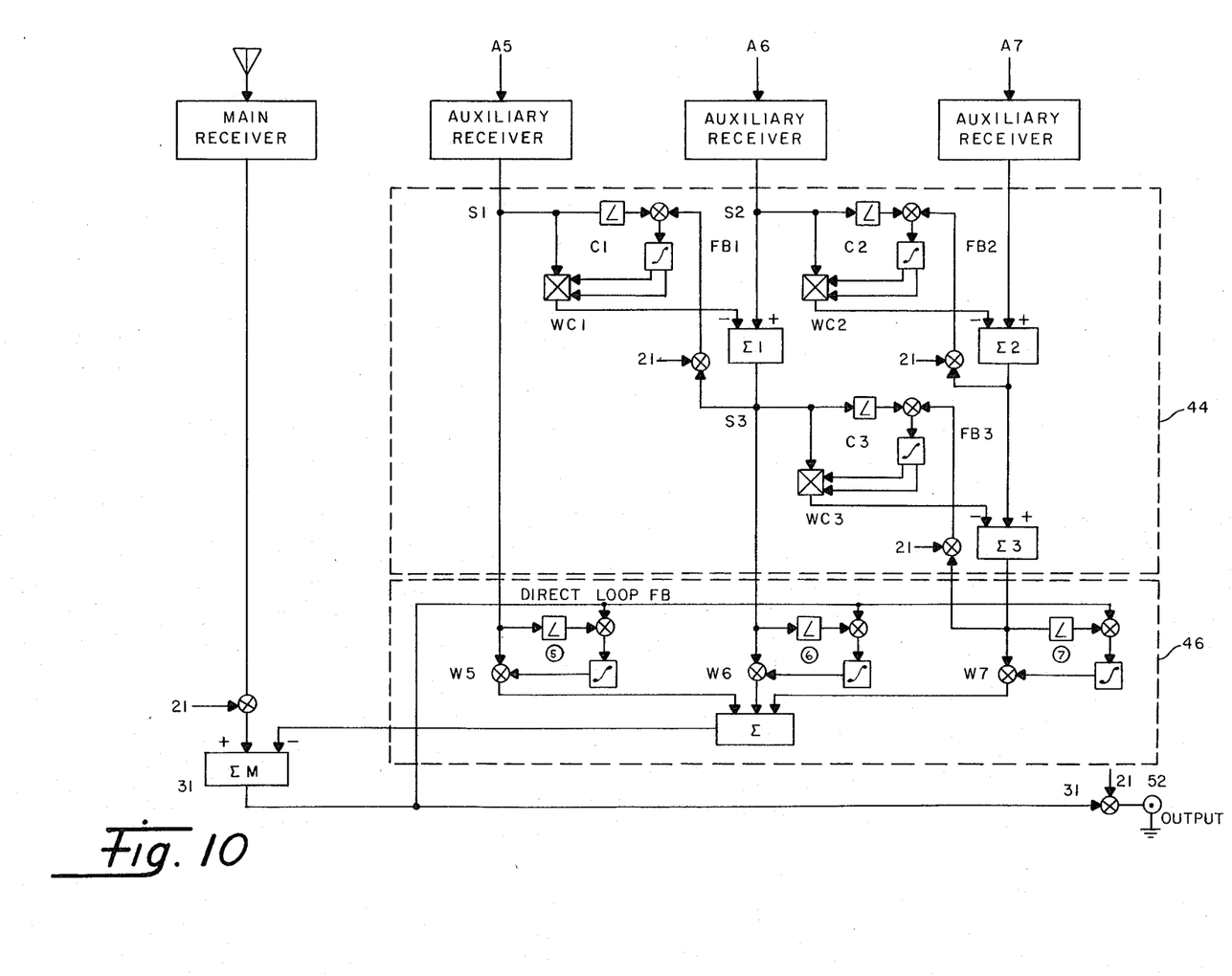
FIG. 10 is a functional block diagram of a coupling loop preprocessor and direct loops for the widely spaced array of FIG. 6.

The coupling loop preprocessor 44 and direct loops 46 for the widely spaced array are shown in FIG. 10. The system is composed of three auxiliary channel inputs at 52 MHz, three preprocessing control loops (C1, C2, C3), and three "direct" loops (5, 6, 7). When the three preprocessing loops are omitted from the system, the resulting configuration is a three-loop (5,6,7) Conventional Sidelobe Canceller (CSLC).

The coupling loop preprocessor 44 is covered by U.S. Pat. No. 4,097,866 by Frost et al for a Multilevel Sidelobe Canceller.

No frequency translations are used in the 52 MHz branches between the outputs of the three receivers and the inputs to the three direct control loops. These direct loops use a double balanced mixer as the weighting network as described in FIG. 9. The weighted auxiliary channel signal enters the main channel cancellation node ($\Sigma_M$) at a frequency of 31 MHz. The carrier frequency of the weights W5, W6, W7 is 21 MHz. A similar direct loop configuration, with one additional control loop, generates weights W1, W2, W3 and W4 for use with the closely spaced array.

A vector modulator form of weighting network is used in each of the three preprocessing loops (WC1, WC2, WC3). This form of network generates a weighted auxiliary signal at 52 MHz which is used to drive the negative input port of the subsidiary cancellation nodes ($\Sigma 1$, $\Sigma 2$, $\Sigma 3$). The feedback signals to the three preprocessing control loops (FB1, FB2, FB3) are generated by mixing samples of outputs of the appropriate subsidiary cancellation nodes against the system 21 MHz oscillator. The carrier frequency of all six feedback signals is 31 MHz.

Figure 11:
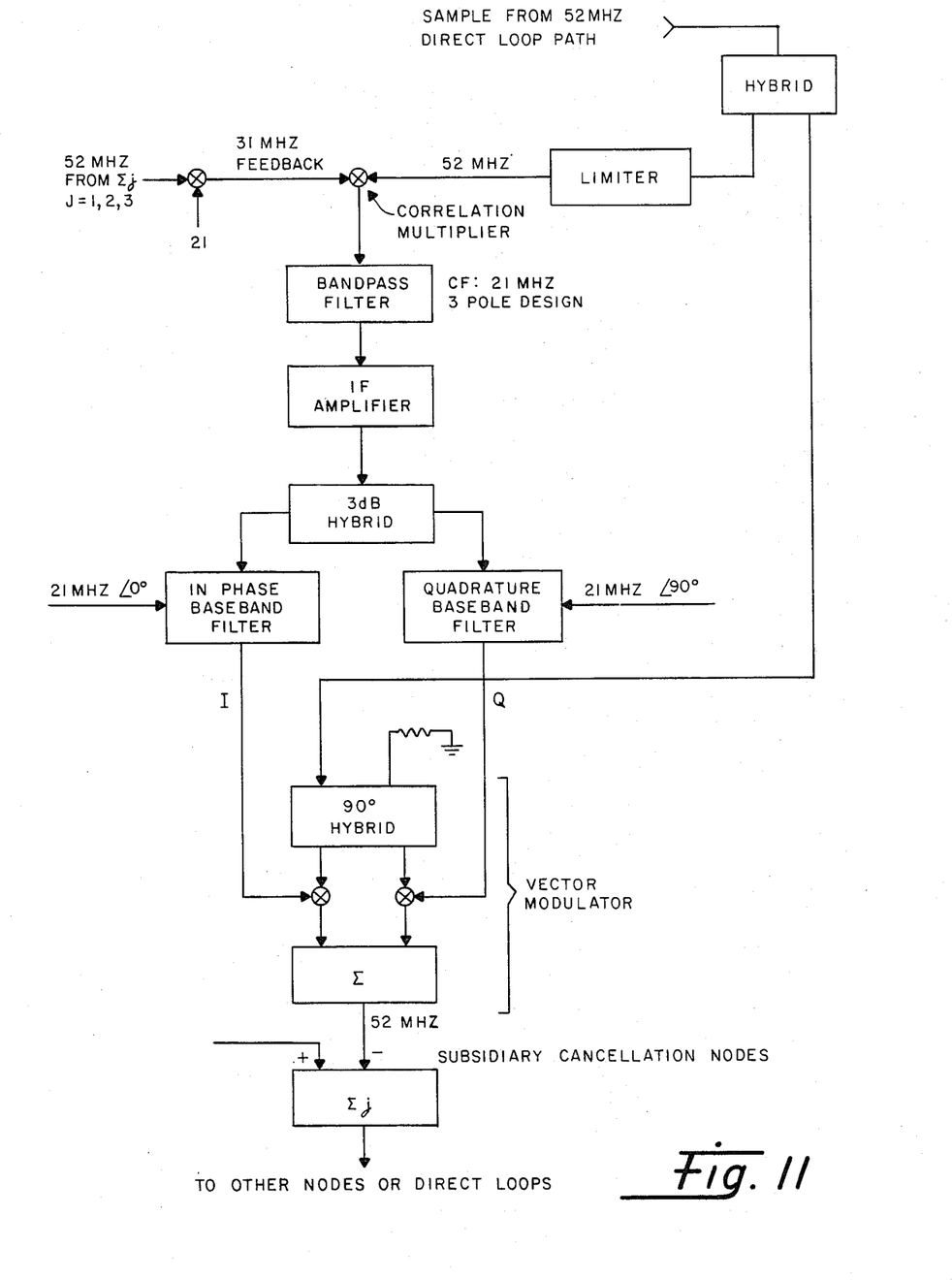
FIG. 11 is a functional block diagram of typical coupling loops in a preprocessor.

FIG. 11 is a block diagram of a typical preprocessing loop. A 52 MHz sample from a signal path driving one of the direct loops (SJ) is divided in a hybrid. One path is limited forming a 52 MHz input to the correlation multiplier. The other output of the hybrid forms the 52 MHz input to the vector modulator weighting network. This network divides the input signal into in-phase and quadrature components. Bipolar attenuator networks are used to weight these components before summation. Through proper choice of these bipolar weights, any amplitude and phase can be impressed upon the 52 MHz input signal.

The 31 MHz feedback signal to the loop correlator is generated by mixing a sample of the 52 MHz output of the subsidiary cancellation nodes ($\Sigma_j$) against the system 21 MHz oscillator. The 21 MHz output of the correlation multiplier is selected for integration after some nominal filtering and amplification. Integration is performed at video frequencies after in-phase and quadrature phase detection. The bipolar outputs of the I and Q baseband filters are used to drive the current controlled attenuators in the vector modulator. The 52 MHz output of the vector modulator forms the negative input to the appropriate subsidiary cancellation node. The output of a particular $\Sigma_j$ forms the feedback signal to the associated preprocessing control loop as shown in FIG. 10.

MULTIPLEXING EXPERIMENT

The Multiplexing of multiple Loop Sidelobe Cancellers covered by U.S. Pat. No. 4,177,464 by Masak was also tested in receiver module 44 with auxiliary antennas A5 and A6.

MODES OF OPERATION

The system of FIG. 6 has the capability of operating in any of eight modes, selected by proper positioning of a front panel control switch. A space uniform mode is defined by the use of only one subarray while a space tapered mode uses both. The four space-uniform modes are:

(1) BP (Beamport)—the closely spaced array A1, A2, A3, A4 with the Butler Matrix beamformer 50.

(2) AP (adaptive processor)—the closely spaced array without the Butler Matrix.

(3) CSLC (conventional sidelobe canceller)—the widely spaced triangular array A5, A6, A7 without preprocessing.

(4) ML (multilevel)—the widely spaced triangular array with multilevel preprocessing 46.

The four space-tapered modes are combinations of the above indicated space-uniform modes with simultaneous feedback as follows:

(5) AP-CSLC
(6) BP-CSLC
(7) AP-ML
(8) BP-ML

SUMMARY OF RESULTS

Extensive computer simulations were performed prior to on-the-air system testing. The performance of the AP, BP, CSLC, (AP-CSLC) and (BP-CSLC) modes was considered for the actual array configurations used during the tests. Both equal power and differential level scenarios were simulated for up to four separate jamming signals. Processor performance was measured by fixing the location of all jammers except one. This last jammer was slowly moved in azimuth and the performance of all modes measured as a function of its angular position.

The widely spaced array configuration (CSLC) demonstrated literally dozens of points where performance degraded because widely spaced jammers were present. The AP, BP, (AP-CSLC) and (BP-CSLC) modes demonstrated consistently superior performance at these same points since the closely spaced subarray was present to compensate for the ambiguities of the CSLC mode.

Widely spaced jammers with a differential power level were also considered. The performance of the AP and CSLC modes degraded; the AP mode because of the differential level problem and the CSLC mode because of both the differential level problem and the ambiguity condition. The performance of the BP and (BP-CSLC) modes was superior because the closely spaced subarray with the Butler Matrix preprocessor can cope with both the differential level problem and the ambiguity.

The converse scenario was also clearly demonstrated for both the equal power and differential level cases. The inability of the closely spaced array (AP) to resolve closely spaced jammers was demonstrated. The superior performance of the CSLC, (AP-CSLC) and (BP-CSLC) modes for this scenario is attributable to the resolution capability of the widely spaced subarray (CSLC).

The computer simulations predicted the angular difference at which the performance of the AP mode would break down. The prediction was later verified in on-the-air tests. The simulations also predicted the precise mobile jammer location at which the CSLC mode would degrade because of the ambiguity problem.

Thus, while preferred constructional features of the invention are embodied in the structure illustrated herein, it is to be understood that changes and variations may be made by the skilled in the art without departing from the spirit and scope of my invention.

I claim:

1. A space tapered multiple jammer sidelobe canceller comprising first and second subsystems for use in a system having a main system for receiving desired and interfering electromagnetic wave energy from a given angular region of space, and main system having a main beam forming antenna and a main receiving means coupled to the main antenna;

said first subsystem comprising a first array of antenna elements, widely spaced several wavelengths between any two elements, and a first unit comprising a plurality of adaptive loops coupled to said antenna elements of the first array;

said second subsystem comprising a second array of antenna elements, closely spaced on the order of one wavelength or less between adjacent elements, and a second unit comprising a plurality of adaptive loops coupled to said antenna elements of the second array; and combining means having inputs from said main receiving means, from said first unit and from said second unit, for summing the signals for generating a system output and adaptive control loop feedback signals supplied on leads to the first and second units, said adaptive control loop feedback signals being used to form in said adaptive loops the generation of cancellation signals in response to correlation between interfering signals appearing in the subsystems and the same interfering signals appearing in said main system.

2. A sidelobe canceller as set forth in claim 1, with simultaneous feedback in which the same output of said summing means is used to supply the same feedback signal to both of the first and second units.

3. A sidelobe canceller as set forth in claim 2, wherein the first array comprises at least two elements and has a total aperture equal to the main antenna aperture; and the second array comprises at least two elements spaced on the order of one wavelength or less.

4. A sidelobe canceller as set forth in claim 2, wherein each element of each of said first and second arrays is an omnidirectional element, and each is coupled to an auxiliary receiver in its subsystem.

5. A space tapered multiple jammer sidelobe canceller comprising first and second subsystems for use in a system having a main system for receiving desired and interfering electromagnetic wave energy from a given angular region of space, said main system having a main beam forming antenna and a main receiving means coupled to the main antenna;

said first subsystem comprising a first array of three antenna elements in a triangular formation, equally spaced several wavelengths, and a first unit comprising a plurality of adaptive loops coupled to said antenna elements of the first array;

said second subsystem comprising a second array of four antenna elements in a linear formation spaced on the order of one wavelength or less, and a second unit comprising a plurality of adaptive loops coupled to said antenna elements of the second array;

wherein each element of each of said first and second arrays is an omnidirectional element, and each is coupled to an auxiliary receiver in its subsystem; and combining means having inputs from said main receiving means, from said first unit and from said second unit, for summing the signals for generating a system output and adaptive control loop feedback signals supplied on leads to the first and second units, said adaptive control loop feedback signals being used to form in said adaptive loops the generation of cancellation signals in response to correlation between interfering signals appearing in the subsystems and the same interfering signals appearing in said main system.

6. A sidelobe canceller as set forth in claim 5, with simultaneous feedback in which the same output of said summing means is used to supply the same feedback signal to both of the first and second units.

7. A sidelobe canceller as set forth in claim 2, 3, 4, or 6, wherein at least one of said subsystems includes preprocessing means coupled before the unit of adaptive loops.

8. A sidelobe canceller as set forth in claim 7, wherein said preprocessing means in the first subsystem comprises a multilevel sidelobe canceller.

9. A sidelobe canceller as set forth in claim 8 wherein the second subsystem also includes preprocessing means comprising a beamformer with a Butler Matrix;

and selection means including a control switch for operating the system in any of several modes including space uniform modes using only one of said subsystems with or without the preprocessing means, and space tapered modes using both subsystems, either or both with its preprocessing means.

10. A sidelobe canceller as set forth in claim 7, wherein said preprocessing means in the second subsystem comprises a beamformer with a Butler Matrix.

* * * * *